US009766111B2

(12) United States Patent
Isobe et al.

(10) Patent No.: US 9,766,111 B2
(45) Date of Patent: Sep. 19, 2017

(54) LIQUID SURFACE DETECTOR

(71) Applicant: DENSO CORPORATION, Kariya, Aichi-pref. (JP)

(72) Inventors: Kenji Isobe, Handa (JP); Yoshifumi Terada, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 130 days.

(21) Appl. No.: 14/435,097

(22) PCT Filed: Sep. 26, 2013

(86) PCT No.: PCT/JP2013/005692
§ 371 (c)(1),
(2) Date: Apr. 10, 2015

(87) PCT Pub. No.: WO2014/061205
PCT Pub. Date: Apr. 24, 2014

(65) Prior Publication Data
US 2015/0276464 A1    Oct. 1, 2015

(30) Foreign Application Priority Data

Oct. 15, 2012  (JP) .................................. 2012-228180
May 7, 2013    (JP) .................................. 2013-097854

(51) Int. Cl.
*G01F 23/38*    (2006.01)
(52) U.S. Cl.
CPC .................................. *G01F 23/38* (2013.01)
(58) Field of Classification Search
CPC ........................................................ G01F 23/38
See application file for complete search history.

(56) References Cited

U.S. PATENT DOCUMENTS

| 5,964,622 A | 10/1999 | Ishikawa et al. |
| 6,564,631 B1 * | 5/2003 | Lake ..................... G01F 23/363 340/450.2 |
| 2005/0247124 A1 | 11/2005 | Fukuhara et al. |

FOREIGN PATENT DOCUMENTS

| JP | H01011718 U | 1/1989 |
| JP | H04113023 U | 10/1992 |

(Continued)

OTHER PUBLICATIONS

International Search Report and Written Opinion (in Japanese with English Translation) for PCT/JP2013/005692, mailed Dec. 3, 2013; ISA/JP.

Primary Examiner — Laura Martin
Assistant Examiner — Alex Devito
(74) Attorney, Agent, or Firm — Harness, Dickey & Pierce, P.L.C.

(57) ABSTRACT

A liquid surface detector includes a terminal, a covering portion, and a sealing film. The terminal includes a ridge portion between a first wall face and a second wall face. The terminal sends an electric signal relating to detection of height of a liquid surface. The covering portion covers the terminal. The sealing film is formed between the terminal and the covering portion and is put into close contact with the terminal and the covering portion. The terminal further includes a groove and two second slant faces. The groove has a V-shape in cross-section and includes two first slant faces. The groove cuts off in the V-shape the ridge portion of an area of the first wall face covered with the sealing film. The two second slant faces respectively connect together an area of the second wall face covered with the sealing film and the two first slant faces. A boundary portion formed by contact between the two second slant faces which are opposed to each other is continuous with a top portion of the groove.

12 Claims, 14 Drawing Sheets

(56) References Cited

FOREIGN PATENT DOCUMENTS

| | | |
|---|---|---|
| JP | H04324323 A | 11/1992 |
| JP | 2501629 | 4/1996 |
| JP | H09300401 A | 11/1997 |
| JP | H10208807 A | 8/1998 |
| JP | 2005321262 A | 11/2005 |

* cited by examiner

LIQUID SURFACE DETECTOR

CROSS REFERENCE TO RELATED APPLICATIONS

This application is a U.S. National Phase Application under 35 U.S.C. 371 of International Application No. PCT/JP2013/005692 filed on Sep. 26, 2013 and published in Japanese as WO 2014/061205 A1 on Apr. 24, 2014. This application is based on and claims the benefit of priority from Japanese Patent Application No. 2012-228180 filed on Oct. 15, 2012 and Japanese Patent Application No. 2013-97854 filed on May 7, 2013. The entire disclosures of all of the above applications are incorporated herein by reference.

TECHNICAL FIELD

The present disclosure relates to a liquid surface detector for detecting the height of a liquid surface of liquid.

BACKGROUND ART

A structure placed at a position soaked in liquid, like a liquid surface detector in a related art, has a sealing structure for restraining the liquid such as fuel from entering the structure. As a kind of this structure, for example, a connector device disclosed in Patent Document 1 has a connector terminal formed in the shape of a thin plate and for sending an electric signal, a resin part for covering the connector terminal, and a sealing film formed between the connector terminal and the resin part.

In addition, the connector terminal described above has a depressed portion formed therein so as to restrain shrinkage, which is caused at the resin part when the sealing film is formed, from impairing a sealing property of the sealing film, the depressed portion being extended along a peripheral direction of the connector terminal. The depressed portion is formed on both side wall faces and on an upper wall face and a lower wall face, between which and both these side wall faces are formed ridge portions, in the connector terminal and has its cross section formed in a trapezoidal shape.

PRIOR ART DOCUMENT

Patent Document

Patent Document 1: JP-H10-208807A

The inventor of the present disclosure has paid attention to the fact that when a ridge portion exists at a terminal included by a liquid surface detector, a sealing film, which is continuous from one wall face to the other wall face across the ridge portion from the one wall face, has its film thickness made thin at a portion covering the ridge portion. This thinning of the sealing film is caused by a sealing material forming the sealing film being pulled to two wall faces located across the ridge portion by a surface tension thereof.

Hence, in order to avoid the thinning of the sealing film, the inventor of the present disclosure has studied the following mode: that is, a groove formed in the trapezoidal shape, which is disclosed in the Patent Document 1, is formed in a terminal; and a sealing material is held in the groove. However, the inventor has found that the thinning of the sealing film cannot be avoided by forming the groove having a cross section formed in the trapezoidal shape.

Describing the reason, each groove whose section is formed in the trapezoidal shape has a bottom formed between two slant faces. Hence, the sealing material forming the sealing film is pulled not only to the two slant faces but also to the bottom by the surface tension thereof. For this reason, the film thickness of the sealing film covering the bottom of the groove is made thin. In a case where at a portion in which two grooves are continuous with each other, the sealing films held by the respective grooves are connected to each other, it is more difficult to secure the film thickness of the sealing film.

SUMMARY OF INVENTION

The present disclosure addresses the above issues. Thus, it is an objective of the present disclosure to provide a liquid surface detector that has a high degree of liquid tightness between a terminal and a covering portion by forming a continuous sealing film between two wall faces of the terminal with a film thickness secured.

To achieve the objective of the present disclosure, in one aspect of the present disclosure, there is provided a liquid surface detector for detecting a height of a liquid surface of liquid. The liquid surface detector includes a terminal, a covering portion, and a sealing film. The terminal includes a first wall face, a second wall face, and a ridge portion which is formed between the first wall face and the second wall face. The terminal sends an electric signal relating to the detection of the height of the liquid surface. The covering portion covers the terminal. The sealing film is formed between the terminal and the covering portion and is put into close contact with the terminal and the covering portion. The terminal further includes a groove and two second slant faces. The groove has a V-shape in cross-section and includes two first slant faces. The groove cuts off in the V-shape the ridge portion of an area of the first wall face covered with the sealing film. The two second slant faces respectively connect together an area of the second wall face covered with the sealing film and the two first slant faces. A boundary portion formed by contact between the two second slant faces which are opposed to each other is continuous with a top portion of the groove.

According to the present disclosure, the sealing material forming the sealing film located in such a way as to cover the first wall face is pulled to the two first slant faces by the operation of a surface tension of the sealing material and is held in the groove, the two first slant faces forming the groove which is cut off in the first wall face and which has the section formed in the shape of the letter V. Hence, the film thickness of the sealing film can be secured at the top portion formed in the bottom of the groove. Further, there is brought about a state in which the sealing material is pulled also to two second slant faces for connecting the respective first slant faces to the second wall face by the operation of a surface tension of the sealing material. For this reason, the film thickness of the sealing film can be secured also at the boundary portion formed by the two second slant faces being put into contact with each other.

When the groove is formed in the shape in which the top portion of the groove is continuous with the boundary portion formed by the two second slant faces, the sealing material held by the top portion of the groove and the sealing material held by the boundary portion can be connected to each other at the portion in which the top portion is continuous with the boundary portion with the thickness film held. According to the construction described above, even if the ridge portion is formed between the first wall face and the second wall face, it is possible to form the sealing film that is continuous from the first wall face to the second wall face with the film thickness secured. Hence, the sealing film can show a high degree of liquid tightness between the terminal and the covering portion.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, a plurality of embodiments of the present disclosure will be described on the basis of the drawings.

Here, constituent elements corresponding to each other in the respective embodiments are given same reference symbols and their duplicate descriptions will be omitted in some cases. In a case where only a part of construction is described in each embodiment, the other parts of the construction can have the constructions of the other embodiments described before can be applied thereto. Further, not only combinations of constructions clearly described in the respective embodiments but also the partial combinations of the constructions of the plurality of embodiments can be made, if the partial combinations do not especially present a problem, even if the partial combinations are not clearly described. These combinations, not clearly described, of the constructions described in the plurality of embodiments shall be disclosed by the following description.

First Embodiment

Figure 1:
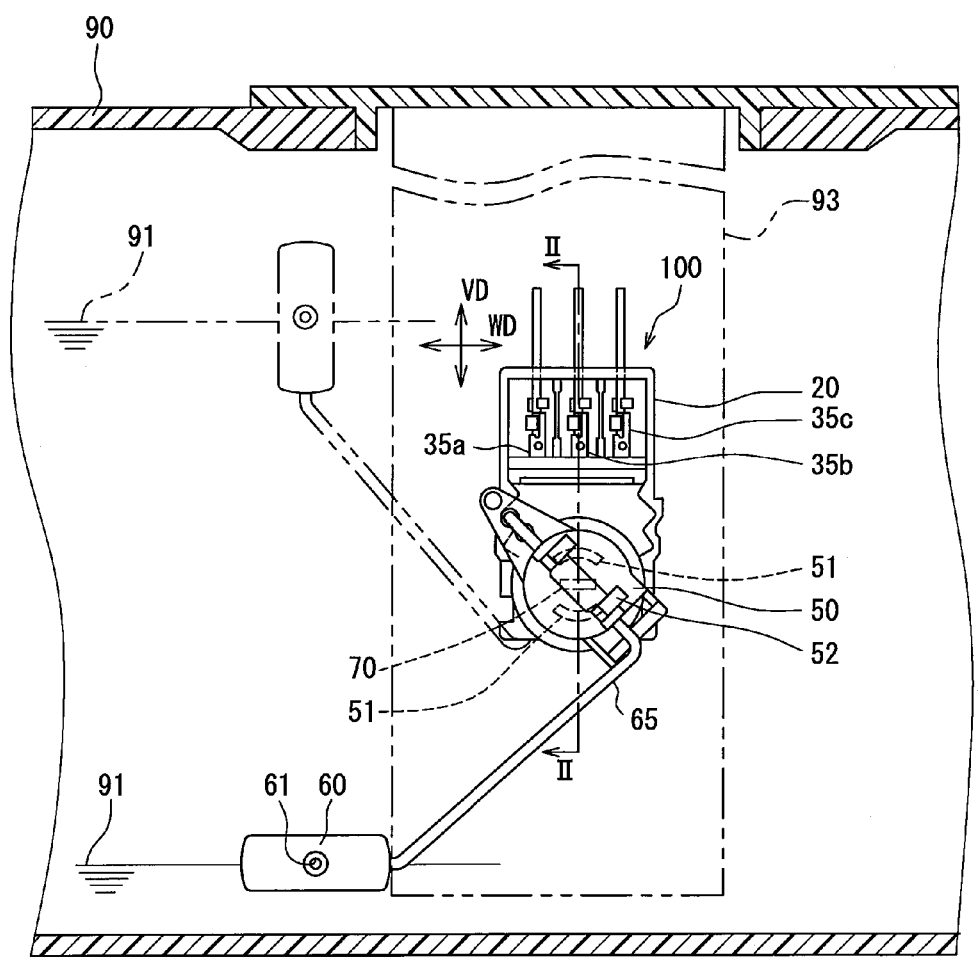
FIG. 1 is a front view of a liquid surface detector according to a first embodiment.

A liquid surface detector 100 according to a first embodiment of the present disclosure, as shown in FIG. 1, is set in a fuel tank 90 for storing fuel as liquid. The liquid surface detector 100 detects the height of a liquid surface 91 of the fuel stored in the fuel tank 90 in a state where it is held by a fuel pump module 93 or the like. The liquid surface detector 100 is constructed of a housing 20, a float 60, a magnet holder 50, and a Hall IC 70.

Figure 2:
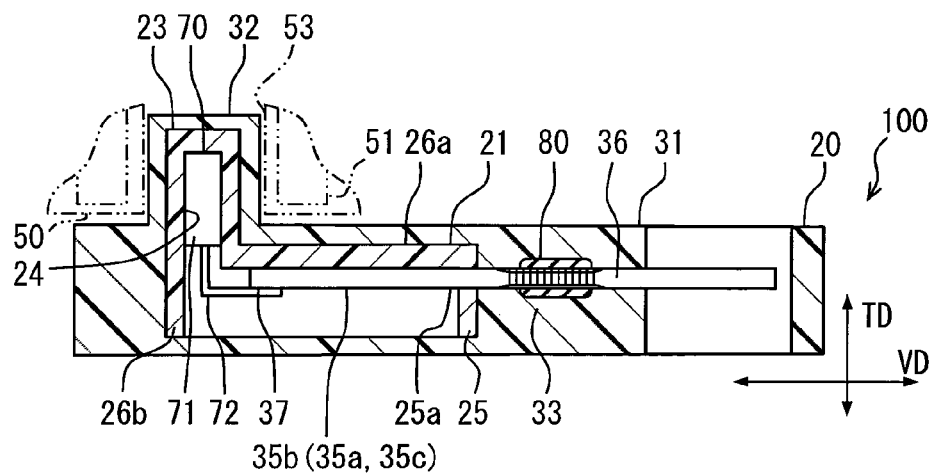
FIG. 2 is a section view taken on a line II-II in FIG. 1.

The housing 20 shown in FIG. 2 is constructed of an inner case 21, terminals 35a to 35c, an outer case 31, a sealing film 80, and the like. The inner case 21 is formed of a resin material such as a polyphenylenesulfide (PPS) resin. The inner case 21 is formed in the shape of a container having a bottom by a bottom wall 26a formed in the shape of a rectangular plate and a side wall 26b erected along an outer edge portion of the bottom wall 26a. The inner case 21 has an inner axis portion 23, an element receiving chamber 24, and a support wall portion 25 formed thereon. Here, in the following description, a longitudinal direction of the bottom wall 26a is assumed to be a vertical direction VD and a direction substantially perpendicular to the longitudinal direction along the bottom wall 26a is assumed to be a width direction WD (see FIG. 1). Further, a plate thickness direction of the bottom wall 26a is assumed to be a thickness direction TD.

The inner axis portion 23 is provided on a side opposite to the side wall 26b across the bottom wall 26a. The element receiving chamber 24 is a space for receiving the Hall IC 70. The element receiving chamber 24 is formed in the inner axis portion 23.

The support wall portion 25 is a portion of the side wall 26b and is located above the inner axis portion 23 in the vertical direction VD. The support wall portion 25 is extended along the width direction WD (see FIG. 1). The support wall portion 25 has three through holes 25a formed therein, the three through holes 25a supporting the terminals 35a to 35c, respectively. The respective through holes 25a are openings for passing the respective terminals 35a to 35c and are formed at equal intervals in the width direction WD. The support wall portion 25 surrounds the entire periphery of the outer peripheral sides of the respective terminals 35a to 35c.

Each of the three terminals 35a to 35c (see also FIG. 1) is formed of a conductive material such as phosphor bronze in the shape of a belt extended in the vertical direction VD. The respective terminals 35a to 35c are used so as to send an electric signal such as voltage between an external unit and the Hall IC 70. A section perpendicular to the longitudinal direction of each of the terminals 35a to 35c, that is, a cross section of each of the terminals 35a to 35c is formed in a rectangular shape. The thickness of each of the terminals 35a to 35c is, for example, approximately 0.6 mm. Each of the terminals 35a to 35c passes through one of the three through holes 25a, thereby passing through the support wall portion 25. Each of the terminals 35a to 35c has a protruding portion 36 and a connecting portion 37.

The protruding portion 36 is a portion protruding to the outside of the inner case 21 from the support wall portion 25 in each of the terminals 35a to 35c. The protruding portion 36 protrudes up along the vertical direction VD. The connecting portion 37 is a portion received in the inner case 21 in each of the terminals 35a to 35c. The connecting portion 37 is connected to the Hall IC 70.

The outer case 31 is formed of a resin material such as a PPS resin. The outer case 31 is formed so as to cover the outside of the inner case 21, thereby receiving the inner case 21. The outer case 31 has an outer axis portion 32 and a covering portion 33 formed therein.

The outer axis portion 32 is formed in a cylindrical shape and covers the outside of the inner axis portion 23 of the inner case 21. An axial direction of the outer axis portion 32 is directed in the thickness direction TD. The outer axis portion 32 is fitted in the magnet holder 50, thereby rotatably supporting the magnet holder 50. The covering portion 33 is extended along the width direction WD (see FIG. 1). The covering portion 33 covers a base end portion of the protruding portion 36 from both sides in the thickness direction TD, thereby protecting the protruding portion 36 from the fuel.

The sealing film 80 is embedded in the covering portion 33. The sealing film 80 is formed between each of the terminals 35a to 35c and the covering portion 33 and is put into close contact with each of the terminals 35a to 35c and the covering portion 33, thereby sealing a clearance produced between them. The sealing film 80 restrains the fuel, which enters the interior of the covering portion 33 passing along the respective terminals 35a to 35c, from entering the interior of the inner case 21 from the clearance between the support wall portion 25 and the respective terminals 35a to 35c.

The float 60 shown in FIG. 1 is formed of a material having a smaller specific gravity than the fuel, for example, foamed ebonite. The float 60 can be floated on the liquid surface 91 of the fuel. The float 60 is supported by the magnet holder 50 via a float arm 65. The float arm 65 is formed of a metal material such as a stainless steel and is passed through a through hole 61 formed in the float 60.

The magnet holder 50 shown in FIG. 1 and FIG. 2 is formed of a resin material or the like in the shape of a circular disc. The magnet holder 50 has a fixing portion 52 and a bearing portion 53 formed therein. In addition, the magnet holder 50 receives a pair of magnets 51. The magnet holder 50 rotates relatively with respect to the housing 20 integrally with the magnets 51 in such a way as to follow the liquid surface 91.

The fixing portion 52 is formed on a top face directing a side opposite to the housing 20 in the magnet holder 50. The fixing portion 52 holds the float arm 65. The bearing portion 53 is formed in a central portion in a radial direction in the magnet holder 50. The bearing portion 53 has a cylindrical hole formed therein along an axial direction of the magnet holder 50. The bearing portion 53 is fitted on the outer axis portion 32 of the outer case 31. The pair of magnets 51 is arranged in such a way as to be opposite to each other across the bearing portion 53, thereby forming a magnetic flux passing through the Hall IC 70 received in the element receiving chamber 24.

The Hall IC shown in FIG. 2 is a detection element for detecting a relative angle of the magnet holder 50 with respect to the housing 20. The Hall IC 70 is constructed of an element main body 71 and three lead wires 72. The element main body 71 is received in the element receiving chamber 24 in such a way as to be sandwiched between the pair of magnets 51. The respective lead wires 72 are extended from the element main body 71 and are connected to the respective connecting portions 37 of the respective terminals 35a to 35c. When the Hall IC 70 has an operation of a magnetic field applied to the element main body 71 thereof from the magnets 51 in a state where voltage is applied thereto, the Hall IC 70 generates voltage proportional to the density of the magnetic flux passing through the Hall IC 70. The voltage generated by the Hall IC 70 is measured by an external unit via the respective lead wires 72 and the respective terminals 35a to 35c.

Figure 3:
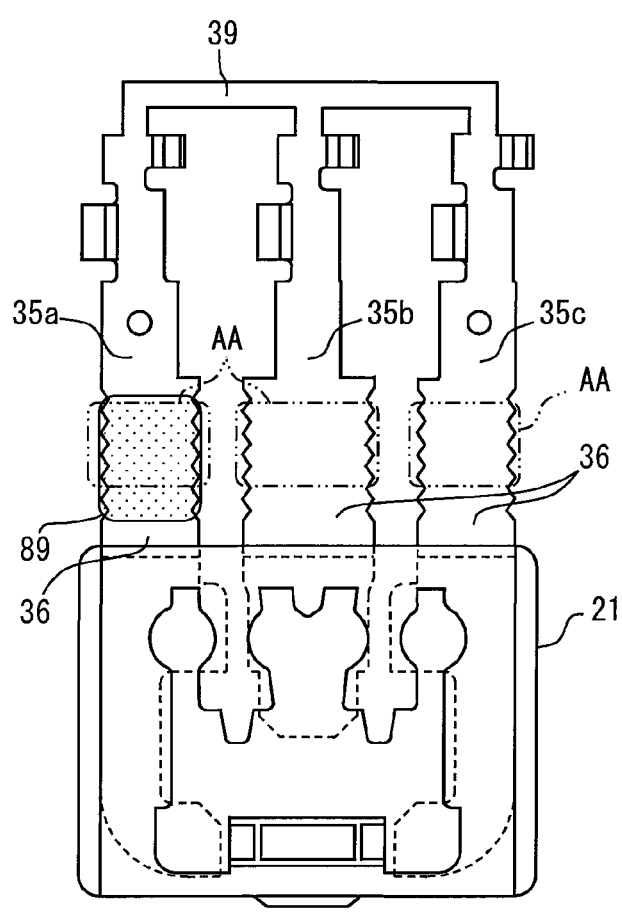
FIG. 3 is a schematic view to schematically show the whole shape of an inner case and a terminal in the first embodiment.

Next, the sealing film 80 formed in the liquid surface detector 100 will be described in more detail. In FIG. 3 are shown the respective terminals 35a to 35c and the inner case 21 which are not yet embedded in the outer case 31 (see FIG. 2). The respective terminals 35a to 35c are brought into a state where they are coupled to each other by a coupling portion 39. In this state, the sealing film 80 (see FIG. 2) is formed of a primer 89 as a sealing material applied in a range including a specified area AA of each of the protruding portions 36. Here, in FIG. 3, the applied primer 89 is schematically shown by dots.

Figure 6:
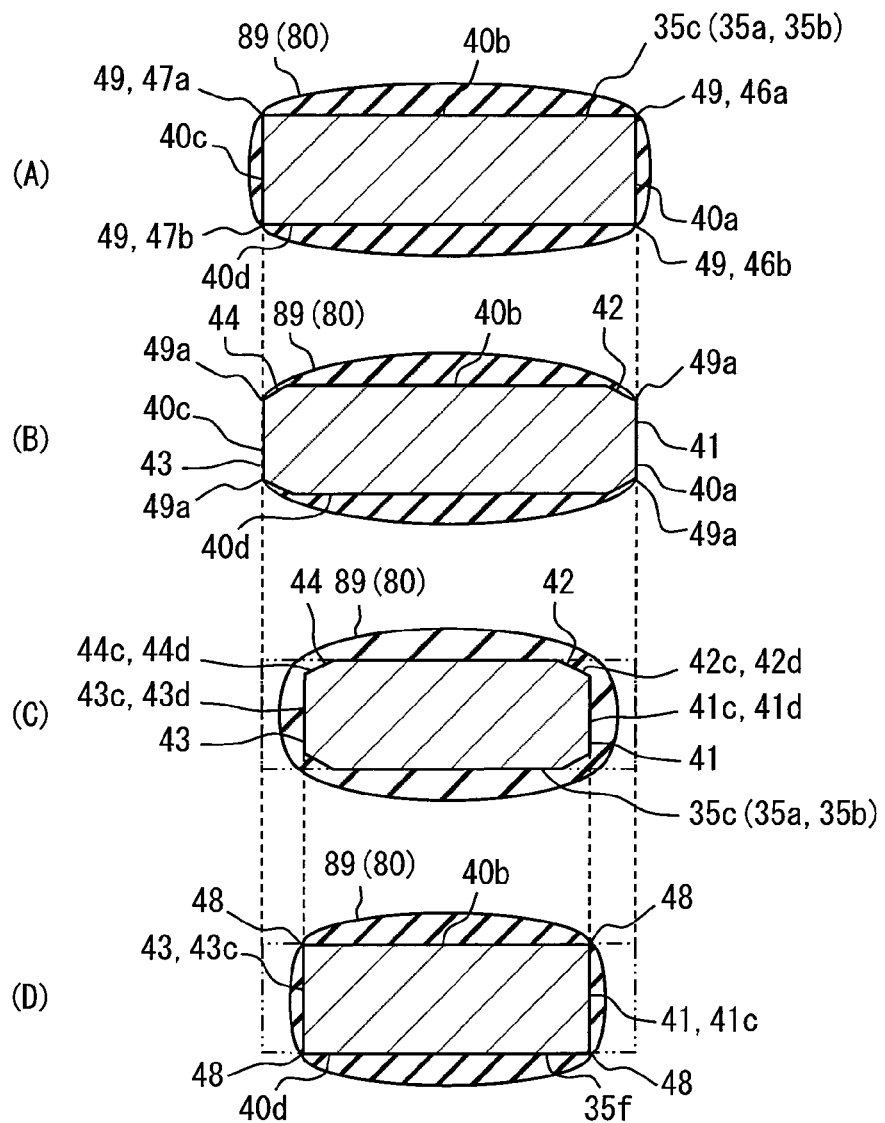
FIG. 6A is a section view taken on a line VIA-VIA in FIG. 5.
FIG. 6B is a section view taken on a line VIB-VIB in FIG. 5.
FIG. 6C is a section view taken on a line VIC-VIC in FIG. 5.
FIG. 6D is a section view to show a comparative example.

The primer 89 is a material such that a sealing material such as an epichlorhydrin rubber is brought into liquid by a solvent such as toluene. The applied primer 89 is heated or is left at room temperature. When the toluene of the solvent is evaporated in this process, the primer 89 is cured on respective wall faces 40a to 40d shown in FIG. 6 (which will be described later) while being pulled by a surface tension. Hence, there is presented a problem that the cured sealing film 80 is easily made thin at four corner portions 49 thereof.

Figure 4:
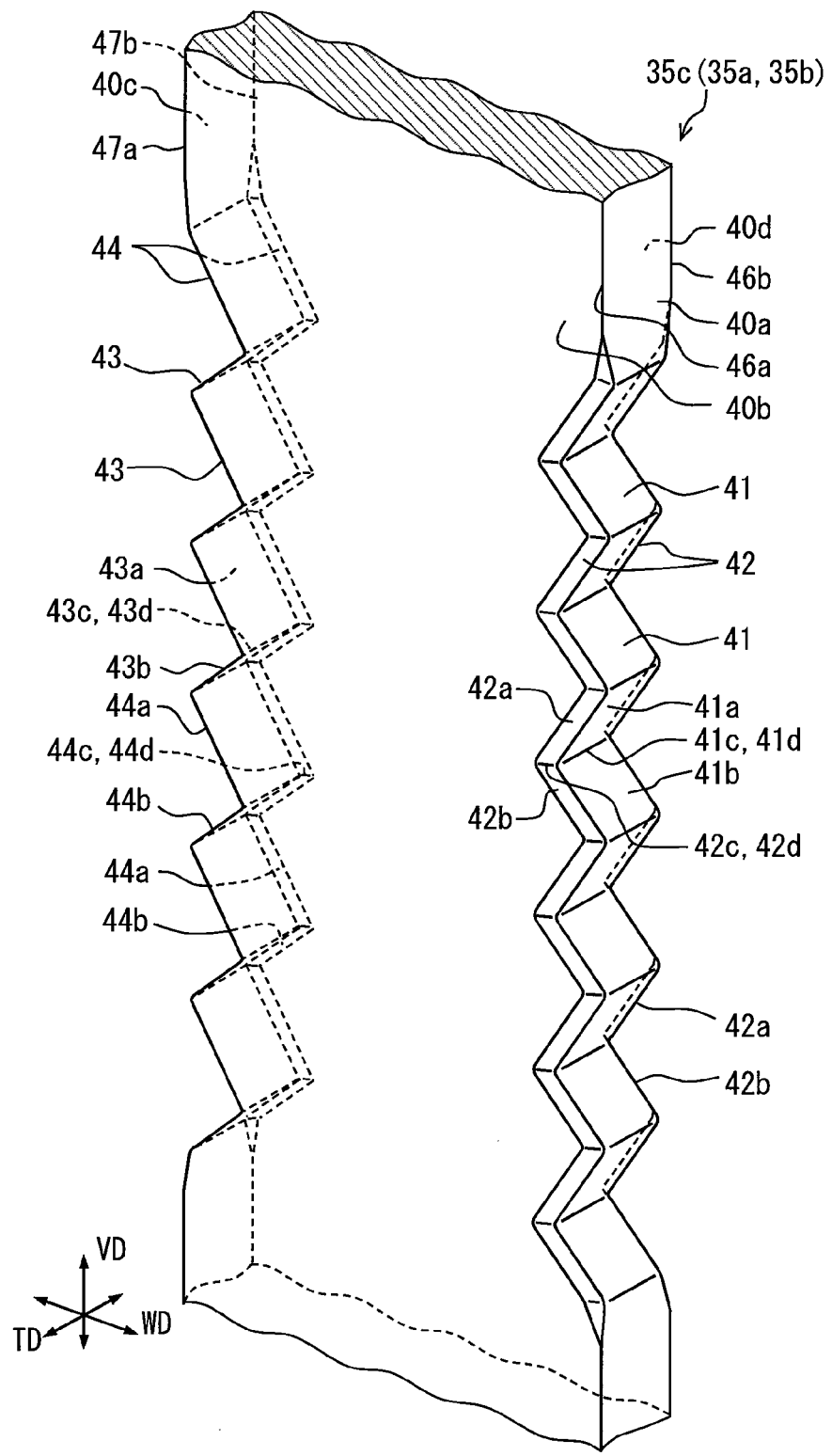
FIG. 4 is an enlarged schematic view of a characteristic portion of the terminal in the first embodiment, the characteristic portion being cut out and enlarged.

Hereinafter, a construction provided in the respective terminals 35a to 35c so as to secure a film thickness of the sealing film 80 at the respective corner portions 49 like this will be described in detail on the basis of FIG. 4 and FIG. 5. Here, in the following descriptions, a characteristic construction provided in the terminal 35c is used but this characteristic construction is provided also in the other terminals 35a, 35b.

In the terminal 35c, side wall faces along the thickness direction TD are assumed to be a first wall face 40a and a third wall face 40c. Further, in the terminal 35c, wall faces which connect the first wall face 40a to the third wall face 40c and which extend long the width direction WD are assumed to be a second wall face 40b and a fourth wall face 40d. The first wall face 40a is located on a side opposite to the third wall face 40c in the width direction WD. The second wall face 40b is located on a side opposite to the fourth wall face 40d in the thickness direction TD. A ridge portion 46a is formed between the first wall face 40a and the second wall face 40b, and a ridge portion 46b is formed between the first wall face 40a and the fourth wall face 40d. Further, a ridge portion 47a is formed between the third wall face 40c and the second wall face 40b, and a ridge portion 47b is formed between the third wall face 40c and the fourth wall face 40d.

The terminal 35c has side grooves 41, 43 and chamfered portions 42, 44 formed thereon. On the other hand, one side groove 41 is a depressed portion which is formed in a region covered with the sealing film 80 and near the region in the first wall face 40a and which has a section formed in the shape of a letter V. The side groove 41 is formed in such a way as to cut off the respective ridge portions 46a, 46b in the shape of a letter V and is extended from the ridge portion 46a to the ridge portion 46b along a peripheral direction of the terminal 35c. As for the side groove 41, a plurality of side grooves 41 (6 in the first embodiment) are arranged continuously in the vertical direction VD.

Each of the side grooves 41 has two first slant faces 41a, 41b opposite to each other in the vertical direction VD. Each of the first slant faces 41a, 41b is formed in the shape of a plane and the first slant faces 41a, 41b are put into contact with each other at a bottom portion 41c of the side groove 41, thereby forming a first intersection 41d as a top portion. The respective first slant faces 41a, 41b are connected to each other in a small radius at this first intersection 41d. For this reason, the first intersection 41d actually has a small width. A distance between the first slant face 41a and the first slant face 41b is gradually decreased from the opening of the side groove 41 to the bottom portion 41c thereof.

The other side groove 43 is a depressed portion which is formed in a region covered with the sealing film 80 and near the region in the third wall face 40c and which has a section formed in the shape of a letter V. The shape of the side groove 43 is substantially same as the shape of the side groove 41. The side groove 43 is formed in such a way as to cut off the respective ridge portions 47a, 47b in the shape of a letter V and is extended from the ridge portion 47a to the ridge portion 47b along the peripheral direction of the terminal 35c. At for the side groove 43, a plurality of side grooves 43 (6 in the first embodiment) are arranged continuously in the vertical direction VD. The respective side grooves 43 are opposite to the respective side grooves 41 in the width direction WD. Each of the side grooves 43 has the substantially same first slant faces 43a, 43b as the first slant faces 41a, 41b of each of the side grooves 41.

One chamfered face 42 is formed by making a plurality of sets of second slant faces 42a, 42b continuous. The second slant faces 42a, 42b are faces for connecting areas covered with the sealing film 80 of the second wall face 40b to the first slant faces 41a, 41b, respectively. One set of second slant faces 42a, 42b are opposite to each other in the vertical direction VD. Each of the second slant faces 42a, 42b is formed in the shape of a plane. The respective second slant faces 42a, 42b are put into contact with each other, thereby forming a second intersection 42d as a boundary portion 42c. The respective second slant faces 42a, 42b are connected to each other in a small radius at this second intersection 42d. For this reason, the second intersection 42d actually has a small width. The second intersection 42d is continuous with the first intersection 41d in the peripheral direction of the terminal 35c. In this way, the second slant face 42a is continuous with the first slant face 41a and the second slant face 42b is continuous with the first slant face 42a. The plurality of sets of second slant faces 42a, 42b are formed in such a way as to be continuous with each other in the vertical direction VD via a small radius. The chamfered portion 42 formed of the plurality of sets of second slant faces 42a, 42b forms the chamfered portion of the ridge portion 46a. Further, an angle α2 (see FIG. 7) which one second slant face 42a forms with respect to the other second slant face 42b is made an obtuse angle. Still further, both of an angle which the second slant face 42a forms with respect to the second slant face 41a and an angle which the second slant face 42b forms with respect to the first slant face 41b are made obtuse angles. The chamfered portion 42 described above is formed also on the fourth wall face 40d. The chamfered portion 42 formed on the fourth wall face 40d has the substantially same shape as each of the chamfered portions formed on the second wall face 40b and forms a part of the ridge portion 46b.

The other chamfered portion 44 is formed by making a plurality of sets of second slant faces 44a, 44b. The second slant faces 44a, 44b have the substantially same construction as the second slant faces 42a, 42b of the chamfered portion 42. The second slant faces 44a, 44b are faces for connecting the area covered with the sealing film 80 of the second wall face 40b to the first slant faces 43a, 43b, respectively. A second intersection 44d that is a boundary portion 44c of the second slant faces 44a, 44b is continuous with the first intersection 43d, which is a bottom portion 43c of the side groove 43, in the peripheral direction of the terminal 35c. In this way, the second slant face 44a is continuous with the first slant face 43a and the second slant face 44b is continuous with the first slant face 43b. The chamfered portion 44 formed of the plurality of sets of second slant faces 44a, 44b forms the chamfered portion of the ridge portion 47a. The chamfered portion 44 described above is formed also on the fourth wall face 40d. The chamfered portion 44 formed on the fourth wall face 40d has the substantially same shape as the chamfered portion formed on the second wall face 40b and forms a part of the ridge portion 47b.

The sealing film 80 formed by applying the primer 89 to the terminal 35c having the construction described above will be described in detail on the basis of FIG. 5 to FIG. 8.

Figure 5:
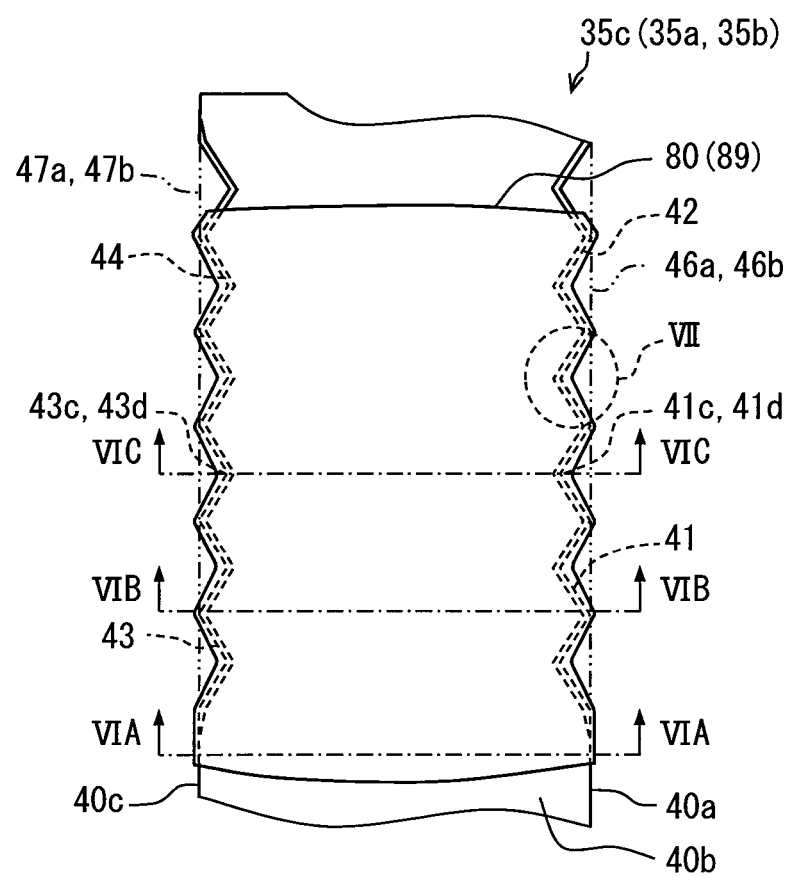
FIG. 5 is an enlarged schematic view of a characteristic portion of the terminal in the first embodiment, the characteristic portion being cut out and enlarged.

As described above, when portions (hereinafter referred to as "straight portion") which do not have the respective side grooves 41, 43 and the respective chamfered portions 42, 44 formed thereon in FIG. 5 are coated with the primer 89, as shown in FIG. 6A, the primer 89 is pulled to the centers of the respective wall faces 40a to 40d by the surface tension. For this reason, the primer 89 is hard to be held by the respective corner portions 49 formed on the respective ridge portions 46a to 47b. Hence, the thicknesses of portions covering the respective corner portions 49 in the sealing film 80 are made very thin.

Further, in FIG. 5, the primer 89 applied to a protruding portion between the adjacent side grooves 41 and to a protruding portion between the adjacent side grooves 43 is pulled to the centers of the respective wall faces 40a to 40d by the surface tension as shown in FIG. 6B, as is the case with the primer 89 applied to the straight portion. In a cross section shown in FIG. 6B, there are formed the respective chamfered portions 42, 44, so that each of both end portions 49a of the respective protruding portion is formed in an obtuse angle. Hence, the primer 89 can be easily held by portions facing the protruding portions in the respective chamfered portions 42, 44. However, the primer 89 is yet hard to be held by the protruding portions of the respective side grooves 41, 43. For this reason, the film thickness of the sealing film 80 at the portions covering the respective both end portions 49a of the respective protruding portions will be made thin.

Figure 7:
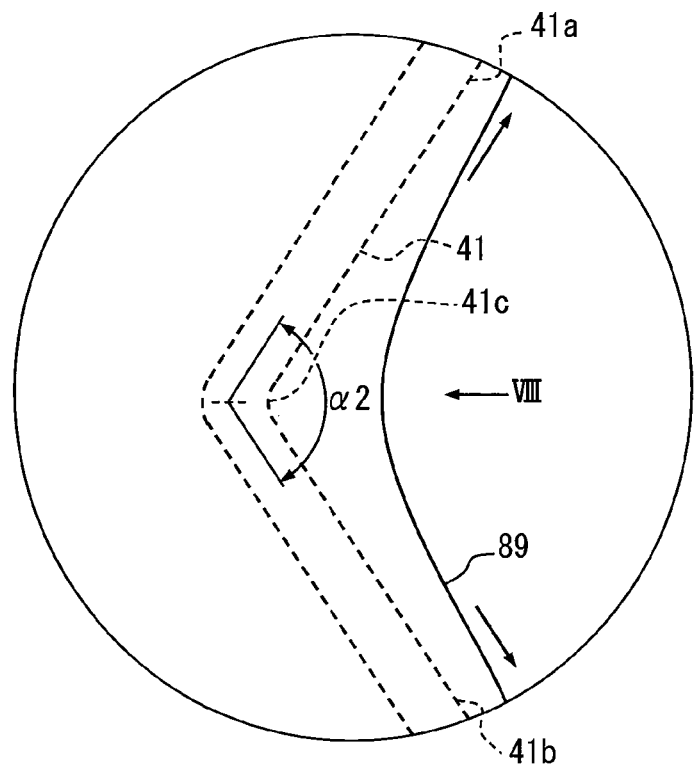
FIG. 7 is an enlarged view of an area VII in FIG. 5.

In contrast to this, in FIG. 5, the primer 89 applied to the respective bottom portions 41c, 43c and the respective boundary portions 42c, 44c (see FIG. 4) can keep its thickness and can cover the terminal 35c in the peripheral direction. Describing in more detail, as shown in FIG. 7, the side groove 41 has its section formed in the shape of a letter V, so that the primer 89 located in such a way as to cover the side groove 41 is pulled to two first slant faces 41a, 41b by the surface tension and is held in the side groove 41. For this reason, the outer surface of the primer 89 near the bottom portion 41c is raised in a direction separating from the bottom portion 41c. Hence, the amount of the primer 89 held near the bottom portion 41c can be secured.

Figure 8:
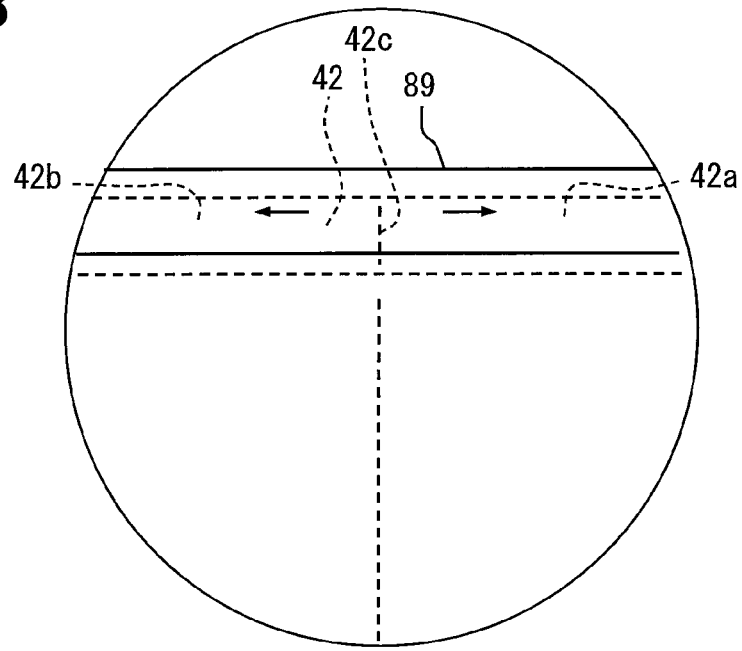
FIG. 8 is a view, when viewed from a VIII direction, of FIG. 7.
Figure 9:
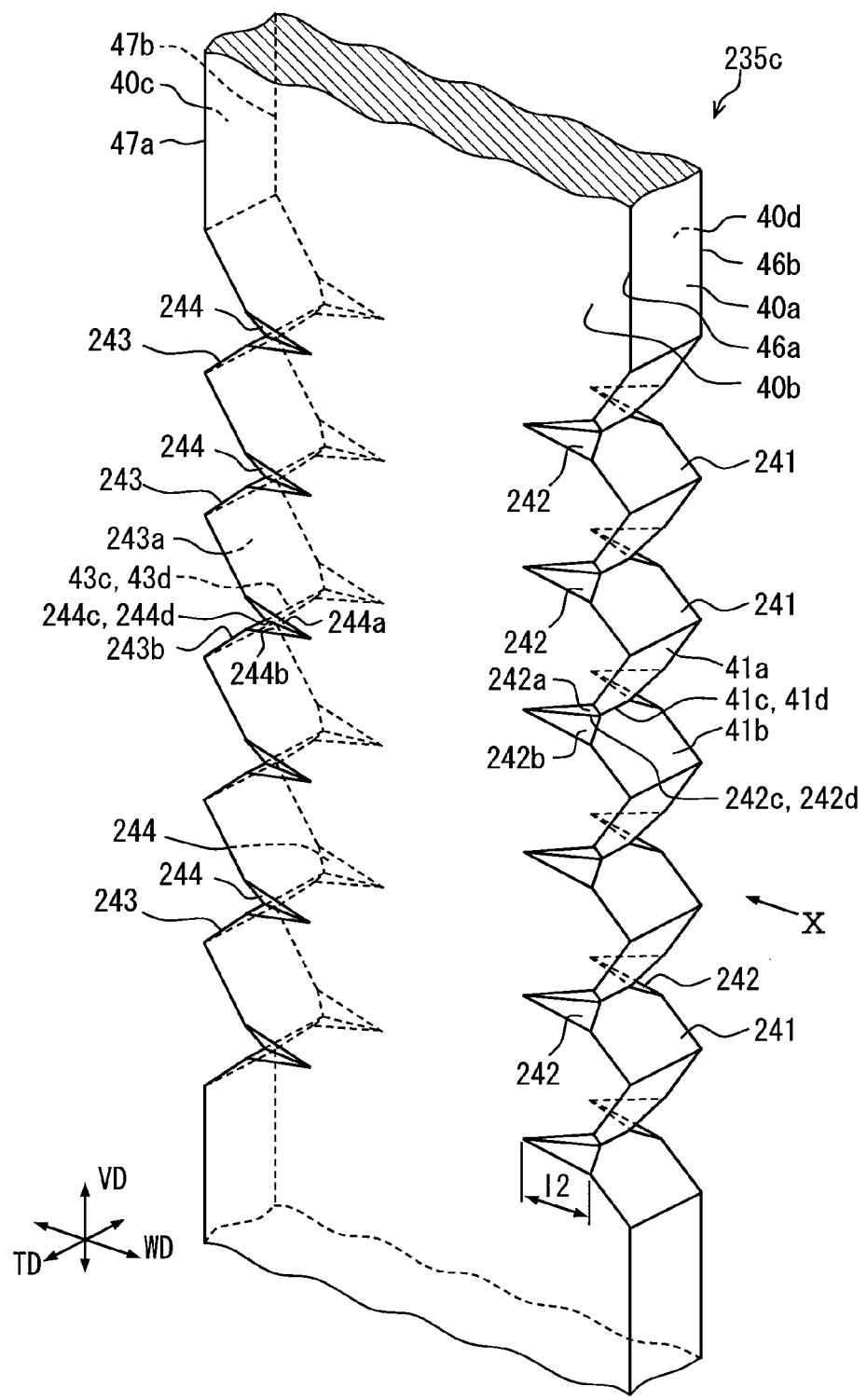
FIG. 9 is an enlarged schematic view of a characteristic portion of the terminal in a second embodiment, the characteristic portion being cut out and enlarged.
Figure 10:
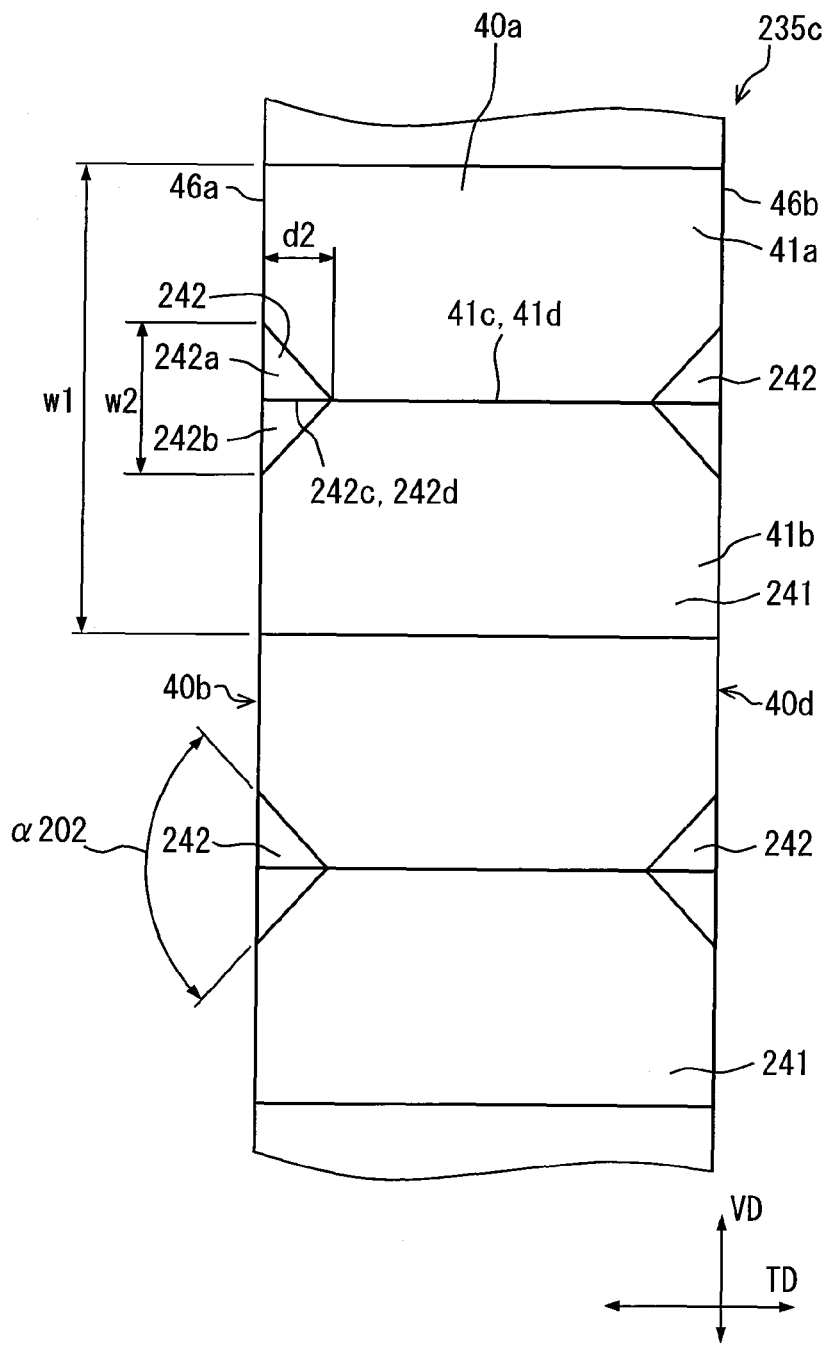
FIG. 10 is a view, when viewed from an X direction, of FIG. 9.

Further, as shown in FIG. 8, the primer 89 located in such a way as to cover the chamfered portion 42 is pulled to the two second slant faces 42a, 42b by the surface tension and is held by the chamfered portion 42. For this reason, the outer surface of the primer 89 near the boundary portion 42c is raised in a direction separating from the boundary portion 42c. Hence, the amount of the primer 89 held near the boundary portion 42c can be secured.

As shown in FIG. 6C, the primer 89 held by the side groove 41 and the primer 89 held by the chamfered portion 42 can be connected to each other at a portion in which the first intersection 41d and the second intersection 42d are continuous with each other with the film thickness at the bottom portion 41c held and with the film thickness at the boundary portion 42c held. Similarly, the primer 89 held by the side groove 43 and the primer 89 held by the chamfered portion 44 can be connected to each other at a portion in which the third intersection 43d and the fourth intersection 44d are continuous with each other with the film thickness at the bottom portion 43c held and with the film thickness at the boundary portion 44c held. From the principle described above, the thickness of the sealing film 80 can be secured in the whole region in the peripheral direction of the terminal 35c.

In addition, a terminal 35f in which the respective chamfered portions 42, 44 are omitted (see FIG. 6C) is shown in FIG. 6D in order to compare with the terminal 35c described above. In the terminal 35f in which only the side grooves 41, 43 are formed, the primer 89 is held on the respective bottom portions 41c, 43c, but a sufficient amount of the primer 89 is hard to be held by portions facing the respective bottom portions 41c, 43c in the second wall face 40b and the fourth wall face 40d. Hence, in the terminal 35f in which the respective chamfered portions 42, 44 are not formed, at portions covering the respective both end portions 48 of the respective bottom portions 41c, 43c, the thickness of the sealing film 80 is thicker than the film thickness of portions covering the respective corner portions 49 shown in FIG. 6A but is very thin.

According to the first embodiment described up to here, the sufficient amount of the primer 89 can be connected to each other at portions in which the respective bottom portions 41c, 43c are continuous with the respective boundary portion 42c, 44c. Hence, the sealing film 80 formed of the cured primer 89 is hard to be broken up in transient portions between the respective wall faces 40a to 40d. In this way, even if the plurality of ridge portions 46a to 47b are formed in the respective terminals 35a to 35c, it is possible to form the sealing film 80 which is continuous between the respective wall faces 40a to 40d with its film thickness secured. Hence, the sealing film 80 can show a high degree of liquid tightness between the respective terminals 35a to 35c and the covering portion 33.

In addition, according to the first embodiment, the angle α2 is made the obtuse angle and hence the primer 89 can further enter between the respective second slant faces 42a, 42b and the respective second slant faces 44a, 44b. In this way, air bubble is hard to enter near the respective boundary portions 42c, 44c and hence the sealing film 80 which is continuous between the respective wall faces 40a to 40d with its film thickness secured can be formed stably.

Further, according to the first embodiment, the first intersection 41d and the second intersection 42d are continuous with each other and the third intersection 43d and the fourth intersection 44d are continuous with each other. In this way, the respective intersections 41d to 44d are located without being misaligned from each other in the vertical direction, so that the primer 89 held by the respective side grooves 41, 43 and the respective chamfered portions 42 can be smoothly continuous from one side to the other side. Hence, the sealing film 80 which is continuous between the respective wall faces 40a to 40d with its film thickness secured can be formed more stably.

Still further, according to the first embodiment, the plurality of sets of second slant faces 42a, 42b, 44a, 44b are connected to each other at the portions facing the protruding portions of the respective side grooves 41, 43. The primer 89 can be held by the respective chamfered portions 42, 44 of the portions facing the protruding portions of the respective side grooves 41, 43 (see FIG. 6B). In this way, the film thickness of the sealing film 80 covering the respective chamfered portions 42, 44 can be secured, which can hence make it harder for liquid to pass along the respective ridge portions 46a to 47b and to enter the covering portion 33.

Still further, according to the first embodiment, the side grooves 41, 43 are formed in a plurality of numbers, respectively, and hence the sealing film 80 can be continuous between the respective wall faces 40a to 40d at a plurality of portions with its film thickness secured. Hence, the function of the sealing film 80 of securing liquid tightness between the respective terminals 35a to 35c and the covering portion 33 can be further improved.

Here, in the first embodiment, the side groove 41 corresponds to "a groove" described in claims and the bottom portion 41c corresponds to "a top portion" described in claims. Further, the housing 20 corresponds to "a fixing body" described in claims and the magnet holder 50 corresponds to "a rotating body" described in claims and the Hall IC 70 corresponds to "a detection element" described in claims.

Second Embodiment

A second embodiment of the present disclosure shown in FIG. 9 to FIG. 14 is a modified example of the first embodiment. In a terminal 235c of the second embodiment shown in FIG. 9 and FIG. 10, the chamfered portions 42, 44 of the first embodiment (see FIG. 4) are omitted. In addition, the terminal 235c has a plurality of first grooves 241 and a plurality of third grooves 243 formed therein and has a plurality of second grooves 242 and a plurality of fourth grooves 244 formed therein. The first groove 241 and the third groove 243 are the substantially same depressed portions as the side grooves 41, 43 in the first embodiment. The first groove 241 has first slant faces 41a, 41b. The third groove 243 has third slant faces 243a, 243b which are substantially same as the first slant faces 43a, 43b of the first embodiment. A maximum width size w1 in opening portions of the first groove 241 and the third groove 243 is set at, for example, approximately 1 mm.

The second groove 242 is a depressed portion which is formed in a region covered with the sealing film 80 in the second wall face 40b and near the region and which has a section formed in the shape of a letter V. As to the second groove 242, a plurality of second grooves 242 (six in the second embodiment) are formed as is the case with the first embodiment. Each of the second grooves 242 is continuous with one of the plurality of first grooves 241 and extends in a direction separating from the first groove 241 along the peripheral direction of the terminal 235c.

In addition, each of the second grooves 242 has two second slant faces 242a, 242b opposite to each other in the vertical direction VD. Each of the second slant faces 242a, 242b is formed in the shape of a plane and the second slant faces 242a, 242b are put into contact with each other at a bottom portion 242c, thereby forming a second intersection 242d. The second intersection 242d is continuous with a first intersection 41d in the peripheral direction of the terminal 235c. In this way, the second slant face 242a is continuous with the first slant face 41a and the second slant face 242b is continuous with the first slant face 41b. Further, both of an angle which the second slant face 242a forms with respect to the first slant face 41a and an angle which the second slant face 242b forms with respect to the first slant face 41b are made obtuse angles.

A distance between the second slant face 242a and the second slant face 242b is gradually decreased from the opening of the second groove 242 to the bottom portion 242c. A maximum width size w2 in an opening portion of the second groove portion 242 is made smaller than the width size w1 of the first groove 241 and is set at, for example, approximately 0.15 mm. Further, the width size w2 of the second groove 242 is made larger than a maximum depth size d2 of the second groove 242. In the second embodiment, an angle α202 which one second slant face 242a forms with respect to the other second slant face 242b is made an obtuse angle. Further, the depth size d2 of the second groove 242 is made smaller as a position is more separated from a ridge portion 46a along the peripheral direction of the terminal 235c. In this way, a length l2 of the second groove 242 is made, for example, approximately 0.2 to 0.3 mm.

The fourth groove 244 is a depressed portion which is formed at a position arranged next to the second groove 242 in the peripheral direction of the terminal 235c and which has a section formed in the shape of a letter V. The shape of the fourth groove 244 is substantially same as the shape of the second groove 242. As to the fourth groove 244, a plurality of fourth grooves 244 (six in the second embodiment) are formed as is the case with the second grooves 242. Each of the fourth grooves 244 is continuous with one of the plurality of third grooves 243 and extends in a direction toward one of the plurality of second grooves 242 and is located separately from the second groove 242.

In addition, each of the fourth grooves 244 has two fourth slant faces 244a, 244b opposite to each other in the vertical direction VD. Each of the fourth slant faces 244a, 244b is formed in the shape of a plane, and the fourth slant faces 244a, 244b are put into contact with each other at a bottom portion 244c, thereby forming a fourth intersection 244d. The fourth intersection 244d is continuous with a third intersection 243d in the peripheral direction of the terminal 235c. In this way, the fourth slant face 244a is continuous with the third slant face 243a and the fourth slant face 244b is continuous with the third slant face 243b. Further, both of an angle which the fourth slant face 244a forms with respect to the third slant face 243a and an angle which the fourth slant face 244b forms with respect to the third slant face 243b are made obtuse angles. Still further, the position of the fourth intersection 244d in the vertical direction VD substantially coincides with the position of the second intersection 242d.

The second grooves 242 and the fourth grooves 244 described up to here are formed also in the fourth wall face 40d. The second grooves 242 and the fourth grooves 244 formed in the fourth wall face 40d have the substantially same shapes as the respective grooves 242, 244 formed in the second wall face 40b.

The sealing film 80 formed by applying the primer 89 to the terminal 235c having the construction described above will be described in detail on the basis of FIG. 11 to FIG. 14.

Figure 11:
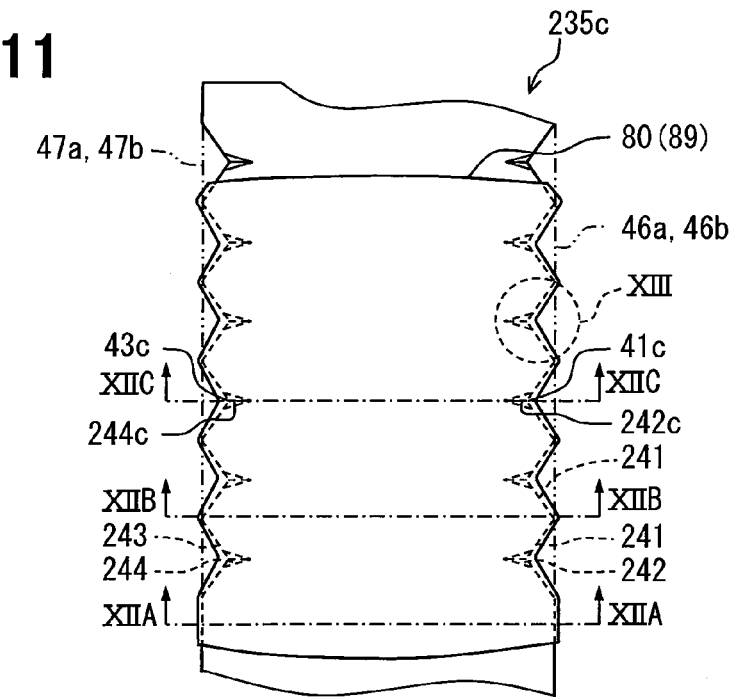
FIG. 11 is an enlarged schematic view of a characteristic portion of the terminal in the second embodiment, the characteristic portion being cut out and enlarged.
Figure 12:
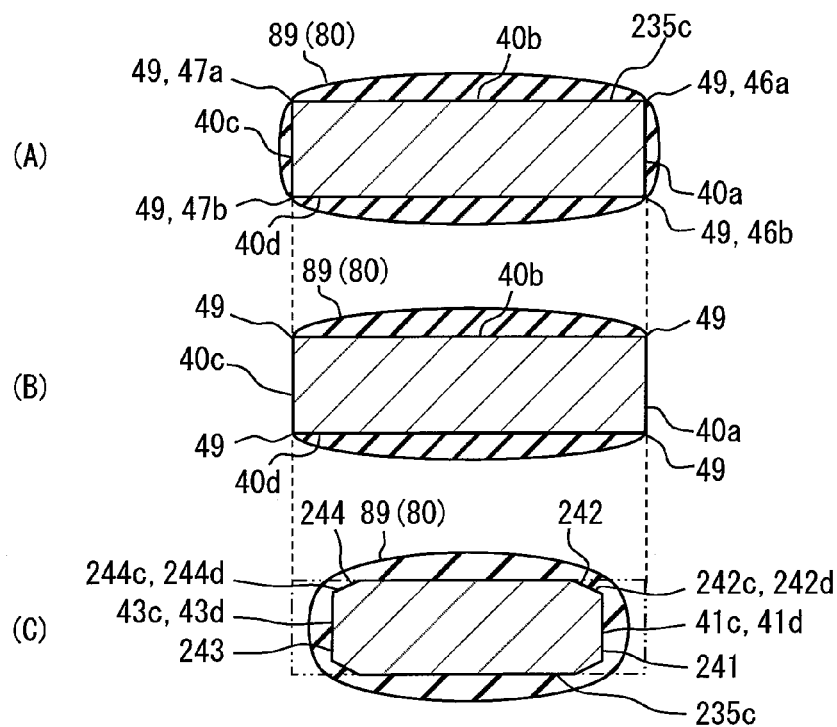
FIG. 12A is a section view taken on a line XIIA-XIIA in FIG. 11.
FIG. 12B is a section view taken on a line XIIB-XIIB in FIG. 11.
FIG. 12C is a section view taken on a line XIIC-XIIC in FIG. 11.

As described above, when straight portions which do not have the respective side grooves 241 to 244 formed therein are coated with the primer 89 in FIG. 11, as shown in FIG. 12A, the primer 89 is pulled to the centers of the respective wall faces 40a to 40d by the surface tension. For this reason, the primer 89 is hard to be held by the respective corner portions 49 formed on the respective ridge portions 46a to 47b. Hence, the thicknesses of portions covering the respective corners 49 in the sealing film 80 are made very thin.

Further, the primer 89 applied to a protruding portion between the adjacent first grooves 241 in FIG. 11 is pulled to the centers of the respective wall faces 40a to 40d by the surface tension as shown in FIG. 12B, as is the case with the primer 89 applied to the straight portions. In this way, the primer 89 is hard to be held by the respective corner portions 49, so that the film thicknesses of the portions covering the respective corner portions 49 in the sealing film 80 are made very thin.

Figure 13:
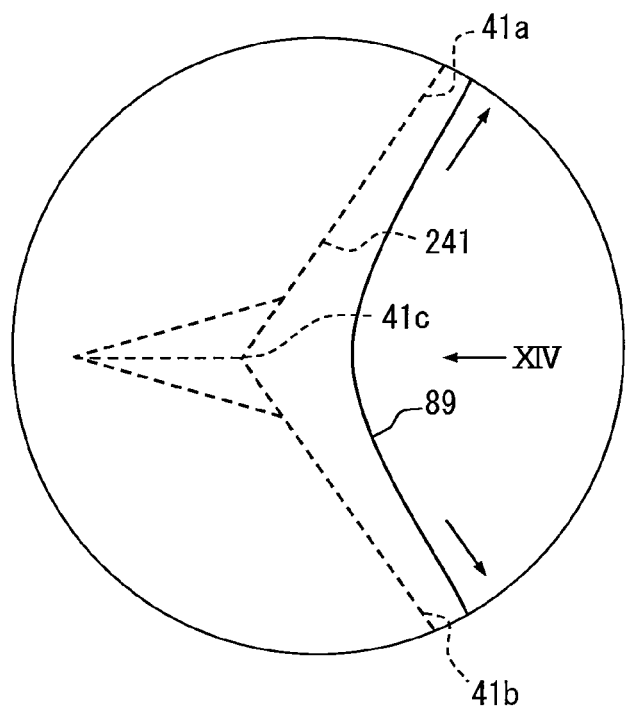
FIG. 13 is an enlarged view of an area XIII in FIG. 11.

In contrast to this, in FIG. 11, the primer 89 applied to the respective bottom portions 41c to 244c can keep its thickness and can cover the terminal 235c in the peripheral direction thereof. Describing in detail, as shown in FIG. 13, the side first groove 241 has a section formed in the shape of a letter V, so that the primer 89 located in such a way as to cover the first groove 241 is pulled to two first slant faces 41a, 41b by the surface tension and is held in the first groove 241. For this reason, the outer surface of the primer 89 near the bottom portion 41c is raised in a direction separating from the bottom portion 41c. Hence, the amount of the primer 89 held near the bottom portion 41c can be secured.

Figure 14:
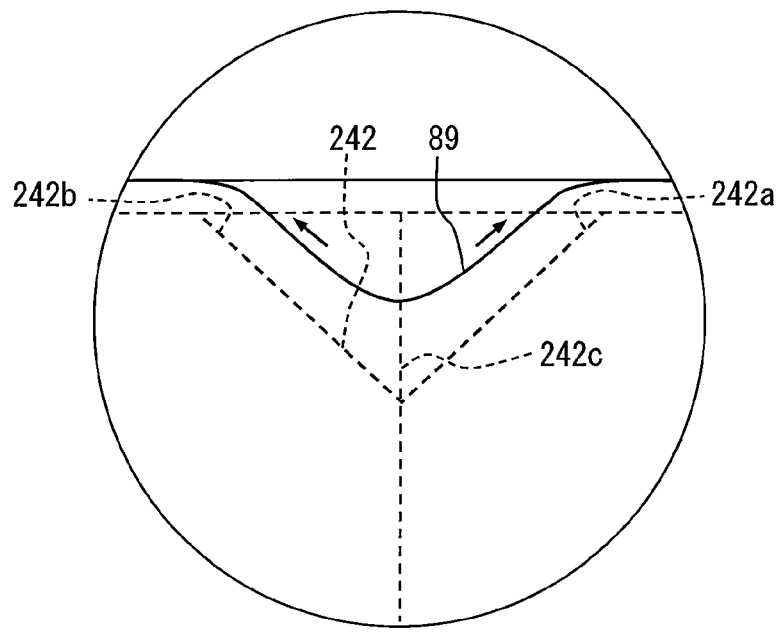
FIG. 14 is a view, when viewed from a XIV direction, of FIG. 13.

Further, as shown in FIG. 14, the second groove 242 has a section formed in the shape of a letter V, so that the primer 89 located in such a way as to cover the second groove 242 is pulled to the two second slant faces 242a, 242b by the surface tension and is held by the second groove 242. For this reason, the outer surface of the primer 89 near the bottom portion 242c is raised in a direction separating from the bottom portion 242c. Hence, the amount of the primer 89 held near the bottom portion 242c can be secured.

As shown in FIG. 12C, the primer 89 held by the groove 241 and the primer 89 held by the groove 242 can be connected to each other at a portion in which the first intersection 41d and the second intersection 242d are continuous with each other with the film thickness in the bottom portion 41c held and with the film thickness in the bottom portion 242c held. Similarly, the primer 89 held by the groove 243 and the primer 89 held by the groove 244 can be connected to each other at a portion in which the third intersection 43d and the fourth intersection 244d are continuous with each other with the film thickness in the bottom portion 43c held and with the film thickness in the bottom portion 244c held. From the principle described above, the thickness of the sealing film 80 can be secured in the whole region in the peripheral direction of the terminal 235c.

Also in the second embodiment described up to here, a sufficient amount of the primer 89 and a sufficient amount of the primer 89 can be connected to each other at a portion in which the first groove 241 and the second groove 242 are continuous with each other and at a portion in which the third groove 243 and the fourth groove 244 are continuous with each other. For this reason, the sealing film 80 which is continuous between the respective wall faces 40a to 40d with its film thickness secured can be formed. Hence, the sealing film 80 can show a high degree of liquid tightness.

In addition, when the width size w2 of the second groove 242 is made smaller than the width size w1 of the first groove 241 as is the case with the second embodiment, areas of the respective first slant faces 41a, 41b can be easily secured. For this reason, the amount of the primer 89 held by the first groove 241 can be increased. As described above, the primer 89 held by the first groove 241 can be more easily connected to the primer 89 held by the second groove 242, for example, at a portion in which the first groove 241 is continuous with the second groove 242. This operation can be shown also at a portion in which the third groove 243 is continuous with the fourth groove 244. Hence, the sealing film 80 can be continuous between the respective wall faces 40a to 40d with its film thickness secured.

Further, even when the respective second grooves 242 and the respective fourth grooves 244 are made shallower as a position is further separated from the respective ridge portions 46a to 47b as is the case with the second embodiment, the sealing film 80 can be continuous between the respective wall faces 40a to 40d with its film thickness secured. In addition, when the respective second grooves 242 and the fourth grooves 244 are gradually shallower, the section size of the terminal 235c in the thickness direction TD can be secured. Hence, a reduction in the strength of the terminal 235c caused by forming the respective second grooves 242 and the respective fourth grooves 244 can be restricted.

Still further, according to the second embodiment, each of the grooves 241 to 244 is formed in a plurality of numbers, so that the sealing film 80 can be continuous between the respective wall faces 40a to 40d at the plurality of portions with its film thickness secured. Hence, the function of the sealing film 80 of securing liquid tightness between the terminal 235c and the covering portion 33 can be further improved.

Here, in the second embodiment, the bottom portion 242c corresponds to "a boundary portion" described in claims. Further, of the plurality of terminals included by the liquid surface detector of the second embodiment, terminals other than the terminal 235c also have the characteristic construction described above.

Third Embodiment

Figure 15:
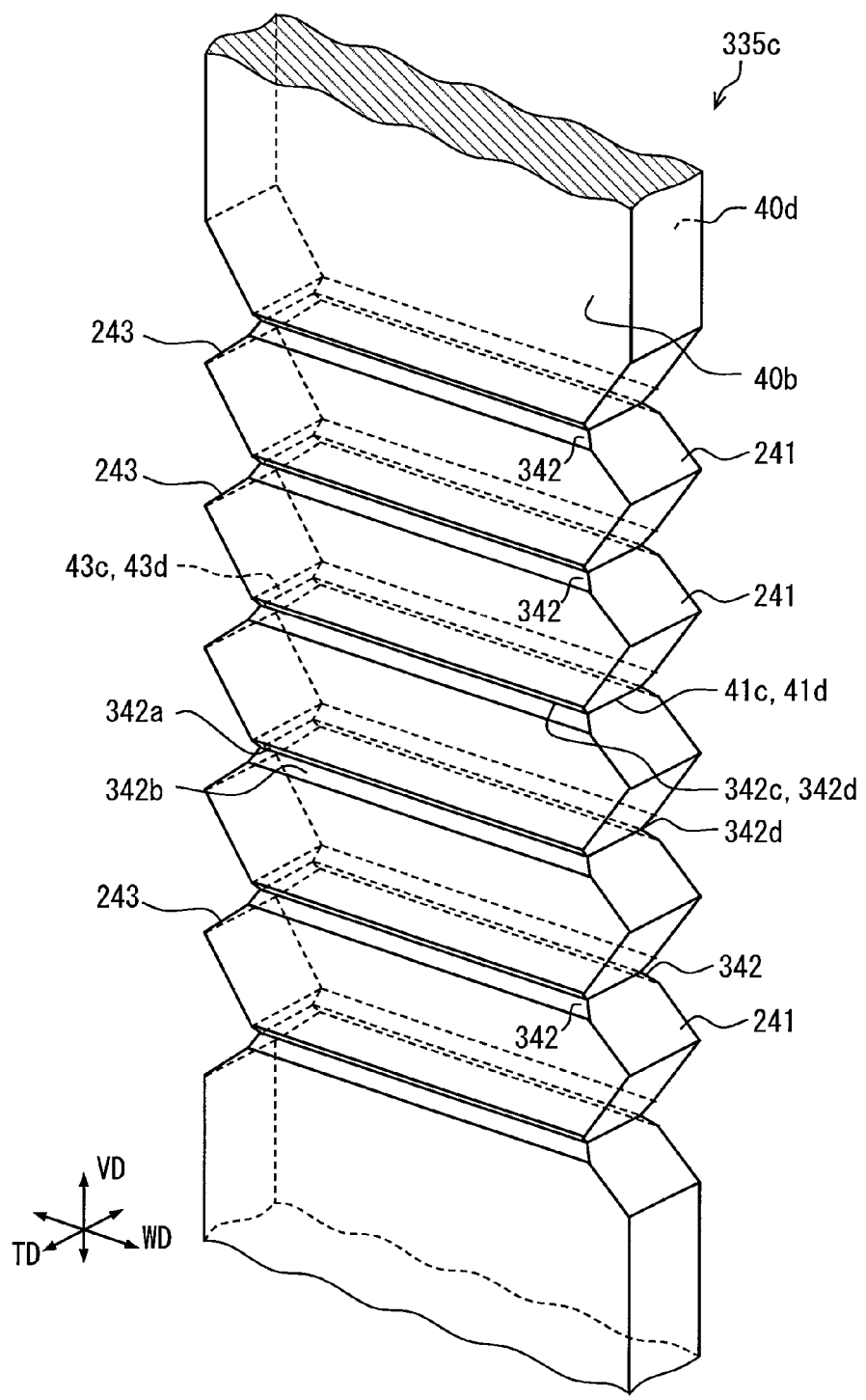
FIG. 15 is an enlarged schematic view of a characteristic portion of the terminal in a third embodiment, the characteristic portion being cut out and enlarged.
Figure 16:
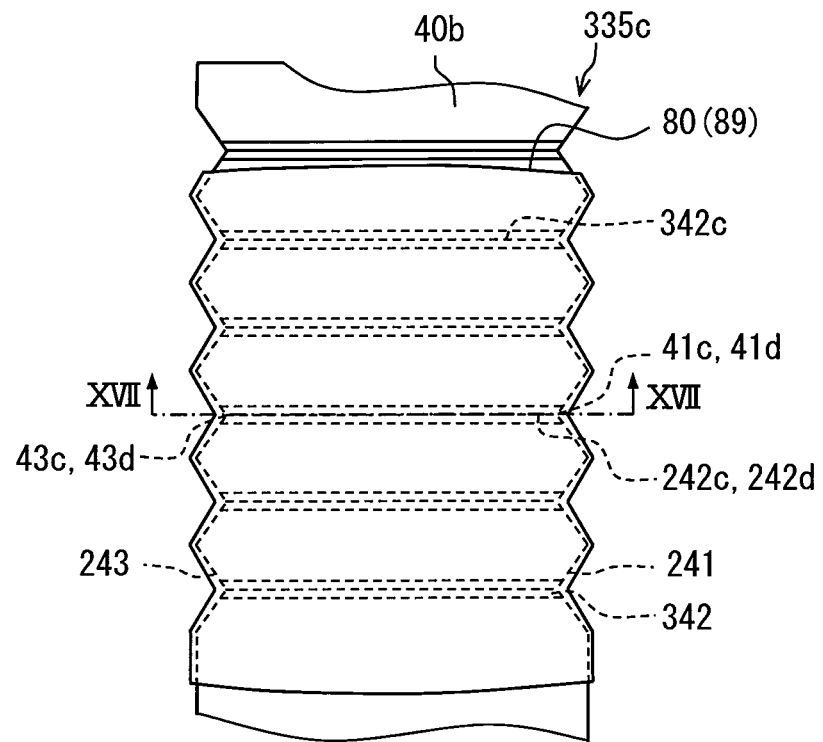
FIG. 16 is an enlarged schematic view of a characteristic portion of the terminal in the third embodiment, the characteristic portion being cut out and enlarged.
Figure 17:
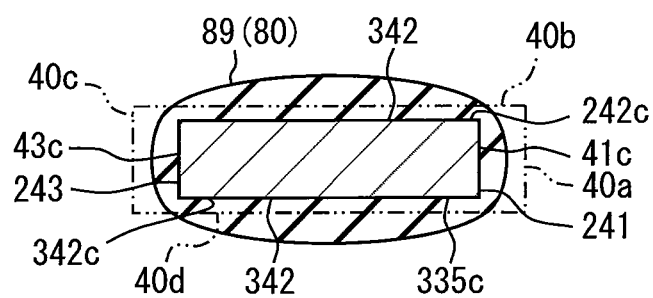
FIG. 17 is a section view taken on a line XVII-XVII in FIG. 16.

A third embodiment shown in FIG. 15 to FIG. 17 is a modified example of the second embodiment. In a terminal 335c of the third embodiment shown in FIG. 15 and FIG. 16, the fourth groove 244 of the second embodiment (see FIG. 9) is omitted. Further, a second groove 342 of the third embodiment has two second slant faces 342a, 342b extending from the first groove 241 to the third groove 243 along a peripheral direction of the terminal 335c in the second wall face 40b and the fourth wall face 40d. In this way, each second intersection 342d is continuous with the first intersection 41d and the third intersection 43d in the peripheral direction of the terminal 335c. Further, the depth of each second groove 342 is substantially made constant. In this regard, of a plurality of terminals included by a liquid surface detector of the third embodiment, terminals other than the terminal 335c also have a characteristic construction to be described later.

The sealing film 80 formed by applying the primer 89 to the terminal 335c will be described in detail on the basis of FIG. 16 and FIG. 17.

In FIG. 16, as to the primer 89 applied to the respective bottom portions 41c, 342c, 43c, a large amount of the primer 89 is held near the respective bottom portions 41c, 342c, 43c by the operation of the surface tension as is the case with the second embodiment. For this reason, as shown in FIG. 17, the primer 89 held by the groove 241 and the primer 89 held by the groove 342 can be connected to each other with the film thickness in the bottom portions 41c held and with the film thickness in the bottom portions 342c held. Similarly, the primer 89 held by the groove 342 and the primer 89 held by the groove 243 can be connected to each other with the film thickness in the bottom portion 342c held and with the film thickness in the bottom portions 43c held. From the principle described above, the film thickness of the sealing film 80 can be secured in the whole region in the peripheral direction of the terminal 335c.

According to the third embodiment described up to here, a sufficient amount of the primer 89 and a sufficient amount of the primer 89 can be connected to each other at a portion in which the first groove 241 and the second groove 342 are continuous with each other and at a portion in which the second groove 342 and the third groove 243 are continuous with each other. For this reason, the sealing film 80 is not broken off at the portions in which the respective grooves 241, 342, 243 are continuous with each other but can be continuous between the respective wall faces 40a to 40d with the film thickness secured. Hence, also the sealing film 80 formed in the third embodiment can show a high degree of liquid tightness.

In addition, according to the third embodiment, the second groove 342 is continuous from the first groove 241 to the third groove 243, so that the sealing film 80 can be surely continuous in the peripheral direction of the terminal 335c in the respective grooves 241, 342, 243. Hence, the liquid tightness of the sealing film 80 can be further improved.

Fourth Embodiment

Figure 18:
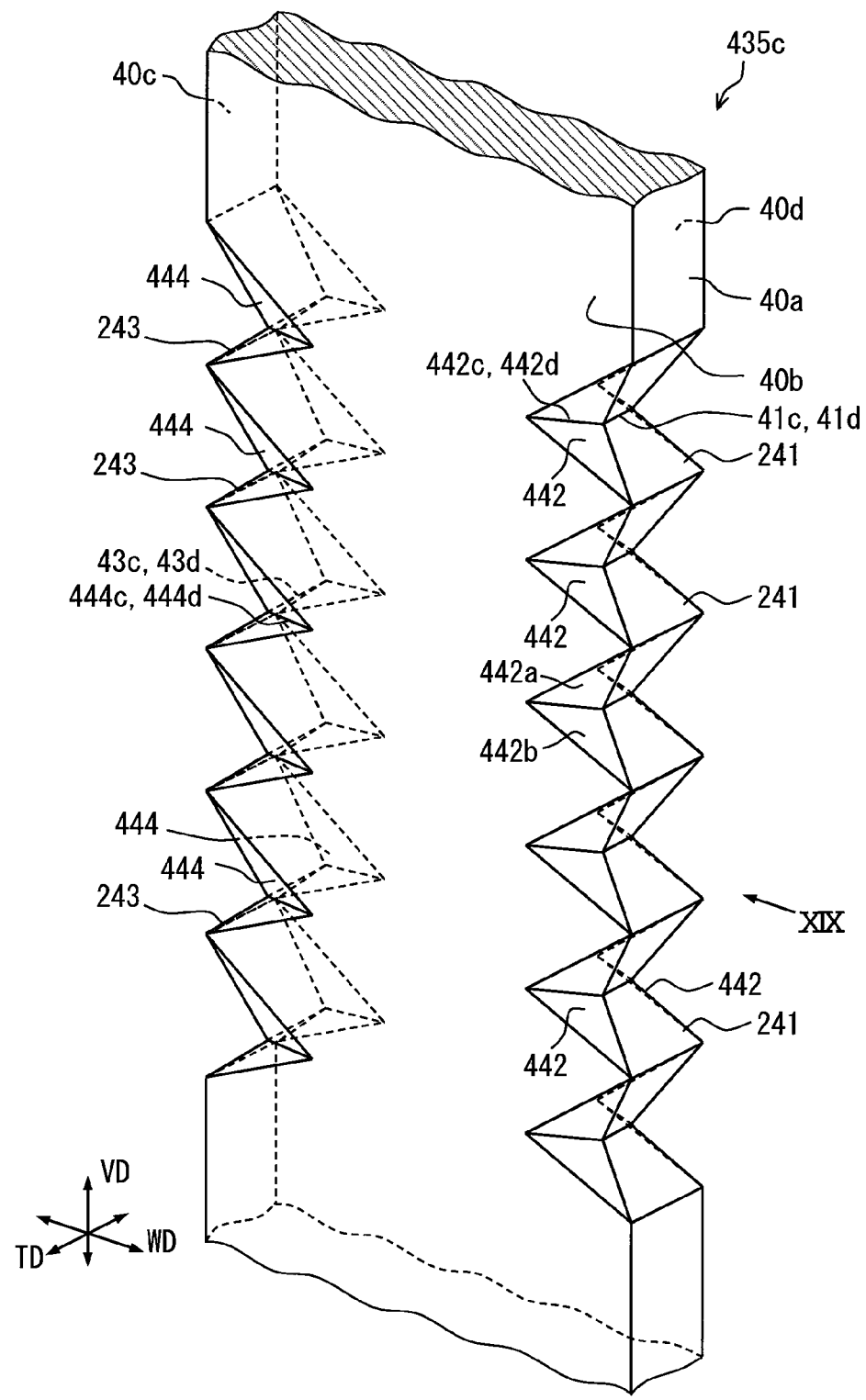
FIG. 18 is an enlarged schematic view of a characteristic portion of the terminal in a fourth embodiment, the characteristic portion being cut out and enlarged.
Figure 19:
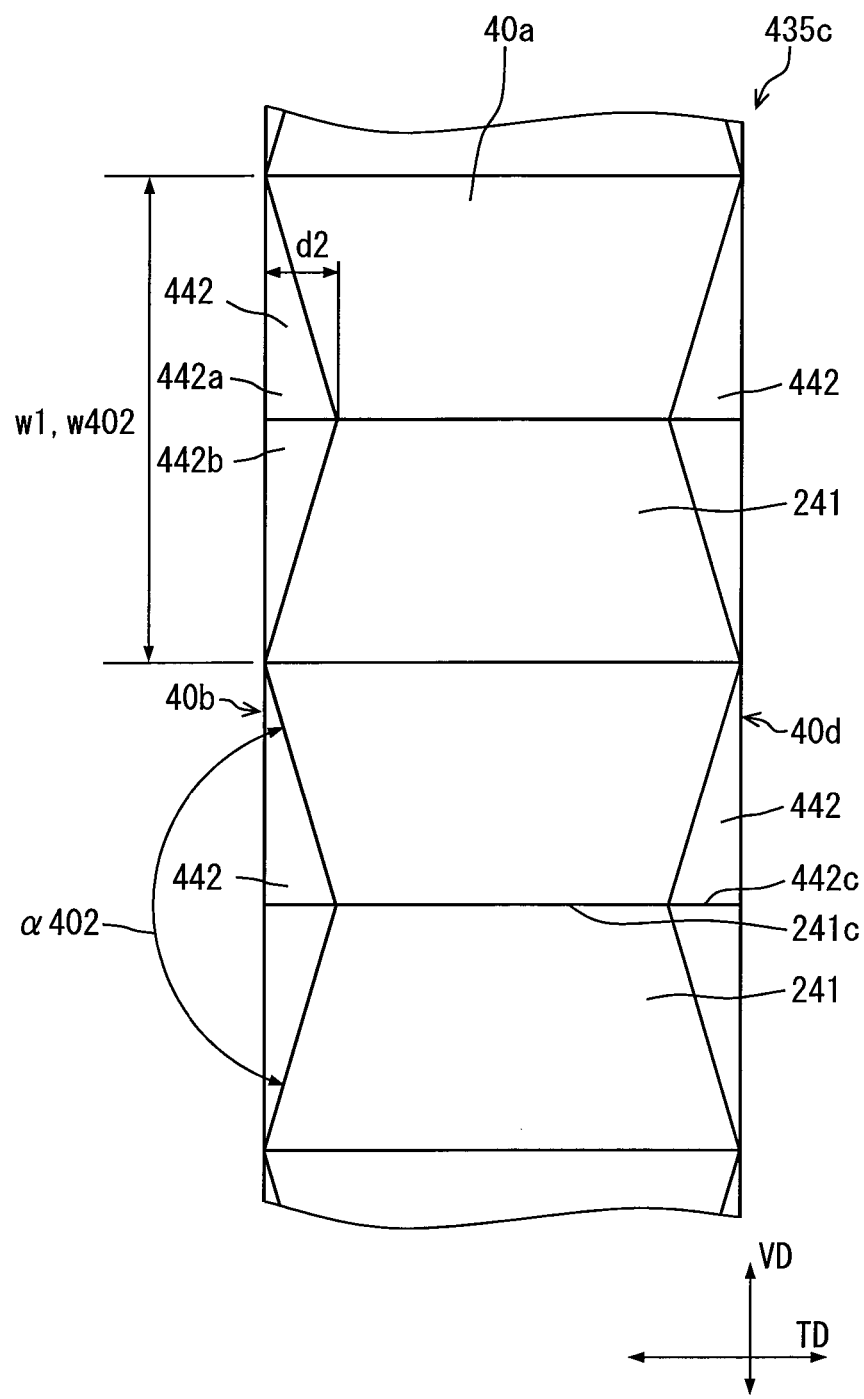
FIG. 19 is a view, when viewed from a XIX direction, of FIG. 18.

A fourth embodiment of the present disclosure shown in FIG. 18 and FIG. 19 is another modified example of the second embodiment. In a terminal 435c of the fourth embodiment, a maximum width size w402 in each of opening portions of the second groove 442 and the fourth groove 444 is enlarged to a maximum width size w1 in each opening portion of the first groove 241 and the third groove 243. In this way, the width size 402 is made notably larger than a maximum depth size d2 in each of the opening portions of the second groove 442 and the fourth groove 444, so that an angle α402 which one second slant face 442a forms with respect to the other second slant face 442b is made an obtuse angle larger than the angle θ202 of the second embodiment (see FIG. 10).

Also in the fourth embodiment described above, the first groove 241 and the second groove 442 make the first intersection 41d and the second intersection 442d continuous with each other in the respective bottom portions 41c, 442c. Similarly, the third groove 243 and the fourth groove 444 make the third intersection 43d and the fourth intersection 442d continuous with each other in the respective bottom portions 43c, 444c. For this reason, a sufficient amount of the primer 89 and a sufficient amount of the primer 89 can be connected to each other at a portion in which the first groove 241 and the second groove 442 are continuous with each other and at a portion in which the third groove 243 and the fourth groove 444 are continuous with each other (see FIG. 11). For this reason, the sealing film 80 is not broken off at the portions in which the respective grooves 241, 442, 243, 444 are continuous with each other but can be continuous between the respective wall faces 40a to 40d with the film thickness secured. Hence, also the sealing film 80 formed in the fourth embodiment can show a high degree of liquid tightness.

In addition, in the fourth embodiment, the angle α402 is enlarged and hence the primer 89 (see FIG. 11) can easily enter the second groove 442 and the fourth groove 444. In this way, air bubbles are hard to enter the respective grooves 442, 444, so that the sealing film 80 (see FIG. 11) which is continuous between the respective wall faces 40a to 40d with the film thickness secured can be more stably formed.

In this regard, of the plurality of terminals included by the liquid surface detector of the fourth embodiment, terminals other than the terminal 435c also have the characteristic construction described above.

Modified examples of the embodiments described above will be described. While the plurality of embodiments according to the present disclosure have been described up to here, it should not be understood that the present disclosure is limited to the embodiments described above, but the present disclosure can be applied to various embodiments and combinations of the embodiments within a scope not departing from the gist of the present disclosure.

In the modified example of the fourth embodiment described above, the second groove having the same width size as the first groove and the third groove extends from the first groove to the third groove. Further, in the modified example of the second embodiment described above, the second groove and the fourth groove are connected to each other while they are made shallower as they are separating from the first groove and the third groove. In this modified example, the respective grooves are connected to each other in the peripheral direction of the terminal with the thickness of the terminal secured. Hence, the sealing film can be made continuous in the peripheral direction of the terminal in the respective grooves.

In the modified examples of the embodiments described above, the positions of the first groove and the second groove and the positions of the third groove and the forth groove are shifted from each other in the vertical direction VD. Further, in another modified example, the position of the first groove and the position of the second groove are shifted from each other in the vertical direction VD. In still another modified example, a pair of second slant faces opposite to each other is formed in shapes asymmetric with respect to a plane including the first intersection and the second intersection. In this manner, the shapes of the pair of slant faces forming each groove may be modified as appropriate.

In the modified examples of the embodiments described above, the second groove has the depth size made larger than the width size. In this manner, an angle which one second slant face forms with respect to the other second slant face may be made an acute angle. In the construction described above, the primer can be easily held by the second groove. For this reason, the film thickness of the sealing film can be more surely secured. However, in a case where it is assumed that the liquid surface detector is mass-produced, in order to increase safety when the sealing film is formed, it is desirable that the angle α2 is made an obtuse angle as is the case with the embodiment described above.

In the modified examples of the embodiments described above, the cross section of the terminal is formed in a polygonal shape not less than a triangular shape or a pentagonal shape. Further, in another modified example, the cross section of the terminal is formed in a flat elliptical shape. In this way, the shape of the terminal may be changed as appropriate. Still further, a ridge portion in the terminal is made a portion whose cross section is rapidly changed in contour as compared with other portion. In other words, in the case of a terminal whose cross section is polygonal, a ridge portion is formed along a corner portion, whereas in the case of a terminal whose cross section is elliptical, a ridge portion is formed along both end portions in a major axis direction.

In the embodiments described above, the sealing film is formed of the epichlorhydrin rubber. However, the material of the sealing film is not limited to the epichlorhydrin rubber. A rubber material other than the epichlorhydrin rubber and an epoxy resin can be employed as the material of the sealing film. Further, a process of forming the sealing film may be modified as appropriate. Still further, it is desirable to secure at least the size of three first grooves in the vertical direction VD as the specified area AA coated with the primer.

In the embodiments described above, by way of example, the PPS resin has been described as the material of the housing 20. However, the material of the housing is not limited to the PPS resin but other resin material may be used.

In the first embodiment described above, it is preferable that the respective chamfered portions 42, 44 are formed by, for example, face pressing (face beating) using a forming die, but a forming method may be changed as appropriate. The chamfered portion like this does not need to be formed in the shape of a plane but may be formed in a curved rounded shape. In addition, the plurality of sets of the second slant faces do not need to be connected to each other. Further, each of the first intersection to the fourth intersection in the embodiments described above may have a corner radius formed therein as appropriate. In addition, each of the corners and nooks formed in respective portions of the terminal may have a small radius (small curved surface) formed therein as appropriate.

In the embodiments described above, each of the terminals has a plating layer formed on its surface, the plating layer showing anticorrosion to the fuel. A process of forming the plating layer may be performed before a process of forming the respective grooves or may be performed after the process of forming the respective grooves. Further, it is desirable that the second groove 42 and the fourth groove 44 of the second embodiment are formed, for example, by pressing, that is, by pressing a convex portion formed on a die onto the terminal. On the other hand, it is desirable that the second groove 242 of the third embodiment is formed, for example, by machining. Of these pressing and machining, in a mode of forming the groove by the pressing, even when the plating layer is formed before the process of forming the groove, the plating layer can be left on the surface of the second groove 42 and on the surface of the fourth groove 44. In this way, the second groove 42 and the fourth groove 44 are formed by the pressing on the terminal having the plating layer previously formed thereon, whereby the terminal contributing to an improvement in the liquid tightness of the seal film can be efficiently produced.

Up to this point, the present disclosure has been described on the basis of the examples in which the present disclosure is applied to a vehicular liquid surface detector 100 for detecting a remaining amount of fuel. An object to which the present disclosure is applied does not need to be limited to this liquid surface detector but may be a liquid surface detector in a container of, for example, brake fluid, engine cooling water, and engine oil. Further, the present disclosure can be applied to a liquid surface detector provided not only in the vehicle but also in various kinds of consumer units and various kinds of transportation machines.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A liquid surface detector for detecting a height of a liquid surface of liquid, the liquid surface detector comprising:
a terminal that includes a first wall face, a second wall face, and a ridge portion which is formed between the first wall face and the second wall face, the terminal sending an electric signal relating to the detection of the height of the liquid surface;
a covering portion that covers the terminal; and
a sealing film that is formed between the terminal and the covering portion and is put into close contact with the terminal and the covering portion, wherein:
the terminal further includes:
a groove that has a V-shape in cross-section and includes two first slant faces, the groove cutting off in the V-shape the ridge portion of an area of the first wall face covered with the sealing film; and
two second slant faces respectively connecting together an area of the second wall face covered with the sealing film and the two first slant faces, the two second slant faces are located respectively between the area of the second wall face covered with the sealing film and the two first slant faces; and
a boundary portion formed by contact between the two second slant faces which are opposed to each other is continuous with a top portion of the groove.

2. The liquid surface detector according to claim 1, wherein an angle made by one second slant face of the two second slant faces with the other second slant face of the two second slant faces is an obtuse angle.

3. The liquid surface detector according to claim 1, wherein:
the groove is one of a plurality of grooves continuous with each other;
the two second slant faces are one pair of a plurality of pairs of second slant faces connecting together the second wall face and the plurality of grooves respectively;
the terminal includes the plurality of grooves and the plurality of pairs of second slant faces; and
the plurality of pairs of second slant faces are formed to be continuous with each other.

4. The liquid surface detector according to claim 1, wherein:
the groove includes a first groove; and
the two second slant faces constitute a second groove that has a V-shape in cross-section and that extends with its boundary portion continuous with the top portion of the first groove.

5. The liquid surface detector according to claim 4, wherein a maximum width size of the second groove is smaller than a maximum width size of the first groove.

6. The liquid surface detector according to claim 4, wherein a maximum width size of the second groove is larger than a maximum depth size of the second groove.

7. The liquid surface detector according to claim 4, wherein the second groove has a maximum depth size that becomes smaller as its position separates further from the ridge portion.

8. The liquid surface detector according to claim 4, wherein:
the terminal has a rectangular cross section and further includes:
a third wall face that is located on an opposite side of the terminal from the first wall face;
a third groove that has a V-shape in cross-section and is provided at an area of the third wall face covered with the sealing film, the third groove cutting off in the V-shape a ridge portion between the third wall face and the second wall face; and
a fourth groove that has a V-shape in cross-section and is provided for the second wall face at a position adjacent to the second groove separately from the second groove; and
the fourth groove is continuous with the third groove and extends toward the second groove.

9. The liquid surface detector according to claim 4, wherein:
the terminal has a rectangular cross section and further includes:
a third wall face that is located on an opposite side of the terminal from the first wall face; and
a third groove that has a V-shape in cross-section and is provided at an area of the third wall face covered with the sealing film, the third groove cutting off in the V-shape a ridge portion between the third wall face and the second wall face; and
the second groove extends from the first groove to the third groove.

10. The liquid surface detector according to claim 4, wherein the terminal includes the first groove and the second groove in a plurality of combinations.

11. The liquid surface detector according to claim 1, wherein a first intersection serving as the top portion formed by contact between the two first slant faces is continuous with a second intersection serving as the boundary portion formed by contact between the two second slant faces.

12. The liquid surface detector according to claim 1, further comprising:
a fixing body that includes the covering portion;
a rotating body that is supported rotatably by the fixing body and is rotated relative to the fixing body in accordance with the liquid surface; and
a detection element that is received in the fixing body and is connected to the terminal, the detection element detecting a relative angle of the rotating body with respect to the fixing body.

* * * * *